United States Patent
Liu et al.

(10) Patent No.: US 11,170,014 B2
(45) Date of Patent: Nov. 9, 2021

(54) METHOD AND SYSTEM FOR PREVIEW OF SEARCH ENGINE PROCESSING

(71) Applicant: Google LLC, Mountain View, CA (US)

(72) Inventors: Shaojun Liu, Campbell, CA (US); Jennifer Lin, Sunnyvale, CA (US); Shuangfeng Li, Beijing (CN); Hui Xu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 231 days.

(21) Appl. No.: 15/393,451

(22) Filed: Dec. 29, 2016

(65) Prior Publication Data

US 2018/0189393 A1  Jul. 5, 2018

(51) Int. Cl.
G06F 16/248 (2019.01)
G06F 16/23 (2019.01)

(52) U.S. Cl.
CPC ............ *G06F 16/248* (2019.01); *G06F 16/23* (2019.01)

(58) Field of Classification Search
CPC ........... G06F 17/3064; G06F 17/30696; G06F 17/30867
USPC ................................. 709/206; 707/769, 770
See application file for complete search history.

(56) References Cited

U.S. PATENT DOCUMENTS

| | | | | |
|---|---|---|---|---|
| 6,360,215 B1 * | 3/2002 | Judd | ...................... | G06F 16/951 |
| 7,599,936 B2 * | 10/2009 | Conway | ................ | G06F 16/958 |
| 7,698,317 B2 * | 4/2010 | Sasturkar | .............. | G06F 40/194 |
| | | | | 707/609 |
| 7,725,453 B1 * | 5/2010 | Chen | ..................... | G06F 16/951 |
| | | | | 707/711 |
| 8,255,386 B1 * | 8/2012 | Annau | .................... | G06F 16/22 |
| | | | | 707/711 |
| 8,583,673 B2 * | 11/2013 | Tarek | .................. | G06F 16/3326 |
| | | | | 707/766 |
| 9,430,155 B2 * | 8/2016 | Amir | ....................... | G06F 3/067 |
| 2003/0084035 A1 * | 5/2003 | Emerick, III | ......... | G06F 16/951 |
| 2005/0144067 A1 * | 6/2005 | Farahat | .................. | G06Q 30/02 |
| | | | | 705/14.52 |
| 2012/0047134 A1 * | 2/2012 | Hansson | ............. | G06F 17/3064 |
| | | | | 707/731 |
| 2012/0047135 A1 * | 2/2012 | Hansson | ............. | G06F 17/3064 |
| | | | | 707/731 |
| 2012/0102020 A1 * | 4/2012 | Pearson | .............. | G06F 16/9566 |
| | | | | 707/709 |
| 2014/0149543 A1 * | 5/2014 | Maeng | ................ | H04L 67/1095 |
| | | | | 709/217 |
| 2014/0172828 A1 * | 6/2014 | Mo | ....................... | G06F 16/337 |
| | | | | 707/722 |
| 2014/0181135 A1 * | 6/2014 | Hansson | ............. | G06F 17/3064 |
| | | | | 707/767 |

(Continued)

*Primary Examiner* — Shahid A Alam
(74) *Attorney, Agent, or Firm* — Lerner, David, Littenberg, Krumholz & Mentlik, LLP

(57) ABSTRACT

Aspects of the disclosed technology include a method including receiving, from a user device, an identification of content; receiving, by a computing device, the identified content; accessing search engine processing logic; processing the received content using the subset of search engine processing logic, without indexing the received content to be accessed for responding to search queries from the search engine; generating a representation of a predicted search result of the received content based on the processing; and transmitting, to the user device, the representation of the predicted search result.

21 Claims, 7 Drawing Sheets

(56) References Cited

U.S. PATENT DOCUMENTS

| | | | | |
|---|---|---|---|---|
| 2014/0337305 A1* | 11/2014 | Karamchedu | G06F 16/9537 | |
| | | | 707/706 | |
| 2014/0358882 A1* | 12/2014 | Diab | G06F 17/30867 | |
| | | | 707/707 | |
| 2014/0379857 A1* | 12/2014 | Kim | H04L 67/32 | |
| | | | 709/217 | |
| 2016/0080815 A1* | 3/2016 | Ruffini | H04N 21/4622 | |
| | | | 725/46 | |
| 2016/0147479 A1* | 5/2016 | Iwanaga | G06F 16/134 | |
| | | | 707/741 | |
| 2016/0321270 A1* | 11/2016 | Hansson | G06F 17/3064 | |
| 2017/0091189 A1* | 3/2017 | Kang | G06F 16/23 | |
| 2017/0249668 A1* | 8/2017 | Delort | G06Q 30/0269 | |

* cited by examiner

METHOD AND SYSTEM FOR PREVIEW OF SEARCH ENGINE PROCESSING

TECHNICAL FIELD

The present disclosure is related to search engine processing logic and, more particularly, to providing a predicted representation of a search result through the use of search engine processing logic.

BACKGROUND

Search engines are often used to locate content through search queries. After receiving a search query, the search engine uses certain processing logic to locate relevant content, such as files and web pages and returns a list of search results. Typically, the list of search results are formatted portions of the content that was previously processed and indexed by the search engine using additional processing logic. When content is changed, however, it may take an extended period of time before the search engine recognizes the changes and re-processes and re-indexes the content. Therefore, when third-party developers make changes to content, they are unable to determine how a search result of the changed content will be presented until the search engine notices the changes and re-indexes the content. Review of any subsequent changes must then be delayed until the search engine identifies those subsequent changes and re-indexes the site.

The related art attempts to provide a reduced delay by arranging certain portions of content to approximate a search result. However, the related art systems do not have access to the processing logic of a search engine and, therefore, the approximation may be unreliable and cannot update automatically to reflect alterations in the search engine processing logic.

Therefore, there is needed a way to provide direct access to search engine processing and indexing logic in order to avoid delay, provide accurate predictions, and update automatically to changes in search engine processing logic.

SUMMARY

Briefly described, and according to one embodiment, aspects of the present disclosure generally relate to a method of generating predicted search results. According to some embodiments, there is provided a method including: receiving, from a user device, an identification of content; receiving, by a computing device, the identified content; accessing search engine processing logic; processing the received content using the subset of search engine processing logic, without indexing the received content to be accessed for responding to search queries from the search engine; generating a representation of a predicted search result of the received content based on the processing; and transmitting, to the user device, the representation of the predicted search result.

The method may further include outputting a tool for identifying content. The identification of the content may be received by way of the tool.

The method may further include: receiving, from the user device, a request to index the content based on the predicted search result; and indexing, in response to the request, the content to be accessed for responding to search queries.

The receiving the identification of the content may include receiving, from the user device, the identification of the content without initializing a request for the identification.

The processing may include: creating an isolated environment separated from a production environment of the search engine; and processing the content in the isolated environment.

The transmitting the representation of the predicted search result may include transmitting the representation of the predicted search result embedded in a mock search query response web page mimicking a query result of the search engine.

The generating may include generating a plurality of predicted search results corresponding to respective query environments.

A first predicted search result of the plurality of predicted search results may correspond to a mobile query environment, and a second predicted search result of the plurality of predicted search results may correspond to a non-mobile query environment.

According to some embodiments, there is provided a system, including: a processor; and a memory having stored thereon instructions that, when executed by the processor, control the processor to: receive, from a user device, an identification of content; receive the identified content; access search engine processing logic; process the received content using the subset of search engine processing logic, without indexing the received content to be accessed for responding to search queries from the search engine; generate a representation of a predicted search result of the received content based on the processing; and transmit, to the user device, the representation of the predicted search result.

The instructions, when executed by the processor, may control the processor to receive the identification of the content without initializing a request for the identification.

The instructions, when executed by the processor, may further control the processor to: receive, from the user device, a request to index the content based on the predicted search result; and, in response to the request, index the content to be accessed for responding to search queries.

The instructions, when executed by the processor, may control the processor to process the content by: creating an isolated environment separated from a production environment of the search engine; and processing the content in the isolated environment.

The instructions, when executed by the processor, may further control the processor to: embed the predicted search result in a mock search query response web page mimicking a query result of the search engine; and transmit the mock search query response web page to the user device.

The instructions, when executed by the processor, may further control the processor to generate a plurality of predicted search results corresponding to respective query environments.

According to some embodiments, there is provided a method including: accessing, by a computing device, a preview tool for previewing search results of a search engine; submitting, by the computing device, a location of content to be processed and indexed using the preview tool; transmitting, by the computing device, the location of the content to a search engine server; receiving, by the computing device, a representation of a predicted search result of the content, the content being processed and indexed as if the content was identified by the search engine without the content being placed in production data of the search engine for responding to search queries; and displaying, by the computing device, the representation of the predicted search result.

The computing device may initialize the submission of the location of the content.

The method may further include submitting, by the computing device using the preview tool, a request to index the content based on the displayed representation of the predicted search result, the content being placed in production data of the search engine for responding to search in response to the request.

The receiving may include receiving a mock search query response web page mimicking a query result of the search engine, the predicted search result being embedded in the mock search query response web page.

The receiving may include receiving a plurality of predicted search results corresponding to respective query environments. A first predicted search result of the plurality of predicted search results may correspond to a mobile query environment, and a second predicted search result of the plurality of predicted search results may correspond to a non-mobile query environment. The displaying may include displaying the first predicted search result and the second predicted search result simultaneously.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

According to some implementations of the disclosed technology, a search engine provides access to its processing and indexing logic in order to provide a predicted search result of identified content. The search engine may provide access to this logic through a software tool, such as a web portal. A third-party is able to identify or submit content through the software tool. The search engine will process the content as if it was preparing the content for future return of search queries, and provide a predicted search result of the content. However, the search engine will not place the content identified through the software tool in its production data. Thus, a reliable predicted result may be prepared without compromising the integrity of future search results.

Example implementations of the disclosed technology will now be described with reference to the accompanying figures.

Figure 1:
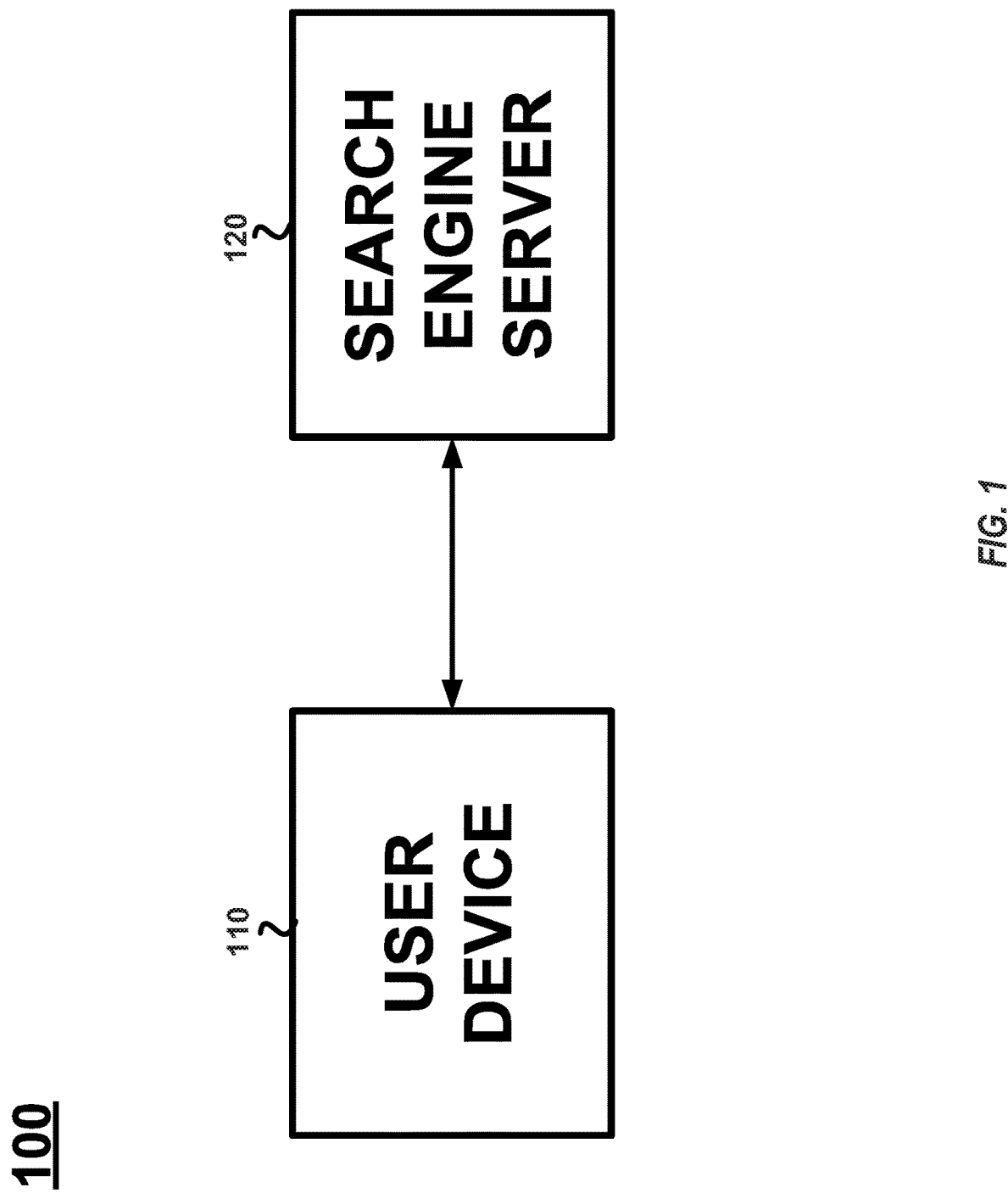
FIG. 1 illustrates an environment in which one or more example embodiments may be implemented.

FIG. 1 illustrates a connected system in which one or more examples of the disclosed technology may be implemented. It will be understood that the networked system 100 is provided for example purposes only, and does not limit the scope of the various implementations of the present disclosed systems and methods.

Referring to FIG. 1, the networked system 100 may include a user device 110 and a search engine server 120. According to some implementations, as non-limiting examples, the user device 110 may be a computing device and may include a personal computer (PC), a mobile computer, a laptop, a desktop, or a Smartphone. According to some implementations, the search engine server 120 may be a computing device, and may include one or more distinct server machines. An example of a computer architecture that may be used to implement one or more of the user device 110 and the search engine server 120 will be discussed below with reference to FIG. 10.

According to some embodiments, the user device 110 accesses a tool provided by the search engine. As non-limiting examples, the tool may be provided through a web portal or a standalone application. Using the tool, the user device 110 may identify content or a location of the content. As non-limiting examples, the content may be identified by a URL or by a file location, and the content may be a web page, a code snippet, or an application.

The search engine server 120 may receive the identification of the content from the user device 110, and may retrieve the content. For example, if the content is identified by a URL, the search engine server 120 may retrieve the content from the URL. As another example, if the content is a file located on the user device 110, and the user device 110 may transmit the file to the search engine server 120.

The search engine server 120 processes and indexes the retrieved content using a subset of its processing logic to produce a predicted search result without placing the processed content in its production data. For example, the search engine server 120 may access the same processing logic as that used for preparing and generating search results, but may prevent the processed content from being indexed for future search results.

In some cases, the search engine server 120 may isolate the processing of the retrieved content from production data of the search engine server 120. Thus, a predicted search result may be generated without the content being available for search results.

In some cases, the search engine server 120 may reference a code library containing code used to process and index content for future searches. However, the search engine server 120 may not reference the code used for placing the content into production.

The search engine server 120 may transmit the predicted search result to the user device 110. The user device 110 may display the predicted search result. In some cases, the user device 110 may display an interface for requesting the content to be indexed by the search engine. For example, if the content is identified by a URL, a user of the user device 110 may request that the search engine immediately index the URL. The search engine server 120 may receive the request to index the content and proceed with indexing the URL. The request may serve as an approval of the predicted search result, and may bypass the content identifying and crawling logic 210 of the search engine server 120.

Figure 2:
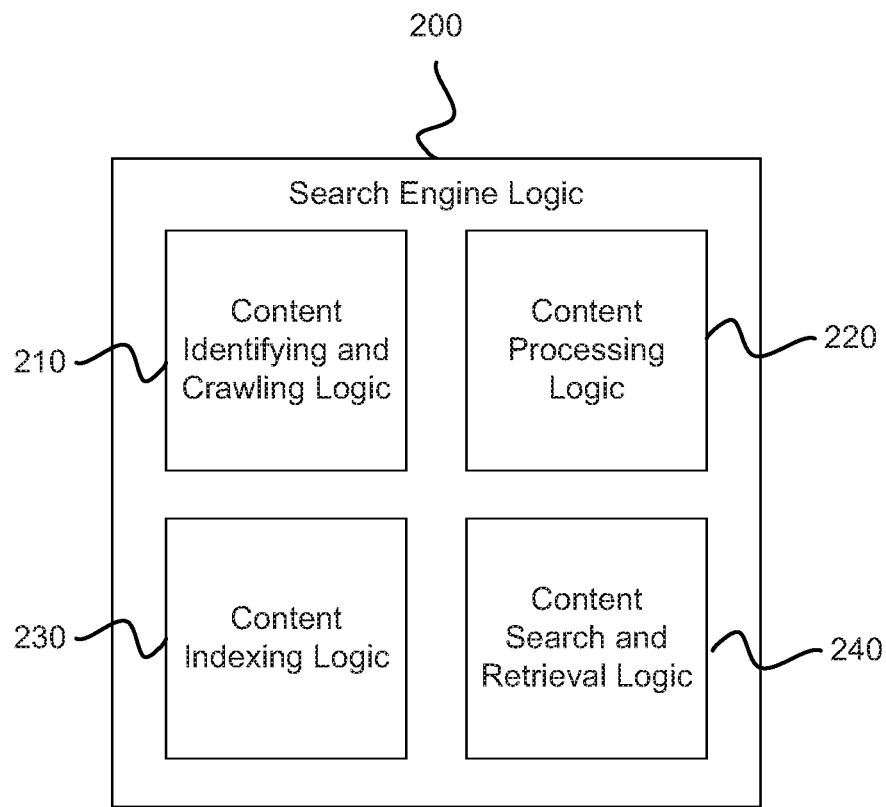
FIG. 2 is a block diagram of search engine logic according to an example embodiment.

FIG. 2 provides a block diagram illustrating search engine processing logic according to an example embodiment. The search engine server 120 may access processing logic 200, including content identifying and crawling logic 210, content processing logic 220, content indexing logic 230, and content search and retrieval logic 240. The crawling logic 210 may be used to identify and parse new and changed content. The processing logic 220 and the indexing logic 230 may be used to analyze the new and changed content, for example, to produce a reference for future searches and analysis for generating a search result. In the related art, information from content that is processed and indexed is placed into a set of production data for analysis and retrieval in response to search queries. The content search and retrieval logic 240 can be used to retrieve and rank content in response to a search request.

According to some embodiments, the search engine server 120 may access a subset of the processing logic 200 to generate a predicted search result of identified content. For example, the processing and indexing may be initiated by a user device 110, and so the search engine sever 120 will not access the content identifying and crawling logic 210. Similarly, since the identified content is not to be placed in production data at this point, the search engine server 120 may not access all of the indexing logic 230 or the content search and retrieval logic 240.

According to some embodiments, the search engine server 120 may execute the subset of the processing logic 200 in an isolated environment such that the processed content does not impact production data of the search engine.

Figure 3:
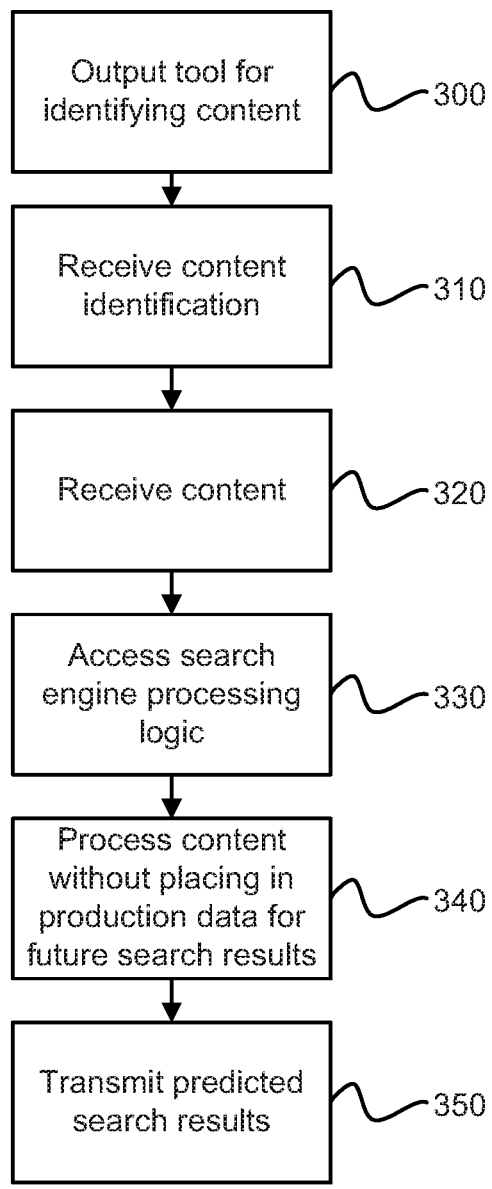
FIG. 3 is a flowchart illustrating a method according to an example embodiment.

FIG. 3 is a flowchart of a method according to an example embodiment. The method may be performed by one or more computing devices, such as the search engine server 120. Referring to FIG. 3, a computing device outputs 300 a tool for identifying content, for example, to the user device 110. As non-limiting examples, the tool may be embedded in a web page or as part of an application. According to some embodiments, the tool may be configured to receive one or more of a URL, program code, and a file of various file types. The computing device receives 310 an identification of the content, and receives 320 the content. According to some examples, the computing device may retrieve the content by requesting the content using the URL, or may be provided the content from the user device 110.

The computing device accesses 330 a subset of search engine processing logic 200. The subset of search engine processing logic 200 may exclude content identification and crawling logic 210, some of indexing logic 230, and the content search and retrieval logic 240. The computing device processes 340 the content using the subset of the processing logic 200 to create one or more predicted search results. The processing 340 may be done without placing the content into production data of the search engine. Thus, the content will not be returned as a search result by the search engine. The computing device then transmits 350 the predicted search results to the user device 110.

Figure 4:
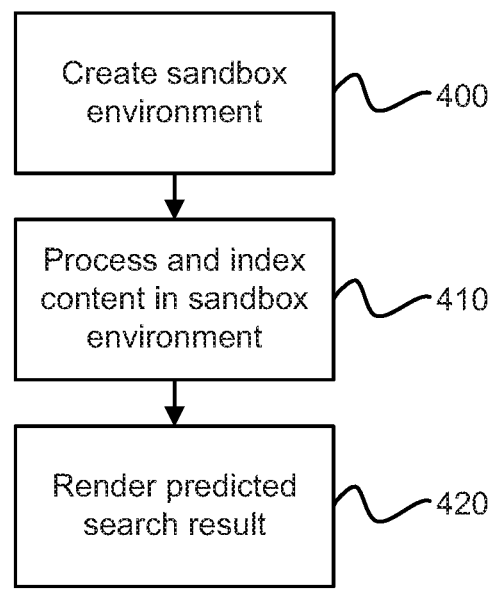
FIG. 4 is a flowchart of processing content according to an example embodiment.

FIG. 4 is a flowchart of the processing 340 of FIG. 3 according to an example embodiment. The processing 340 may include the computing device creating 400 a sandbox environment. The sandbox environment may isolate execution of processing logic 200 from the production environment, production data, and indexes of the search engine. The computing device may then process and index 410 the content in the sandbox environment, and render 420 the predicted search result.

Figure 5:
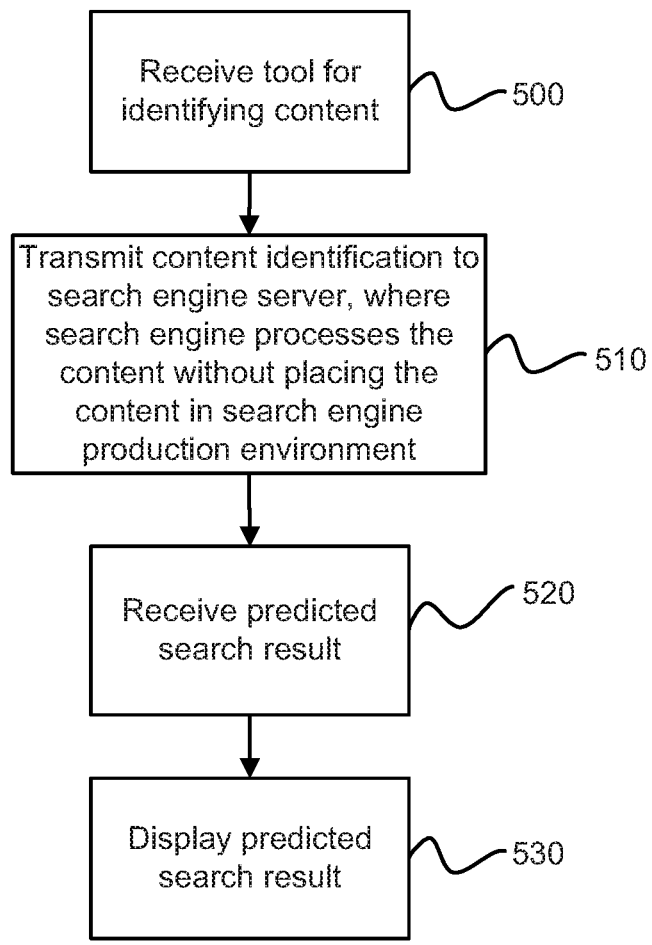
FIG. 5 is a flowchart illustrating a method according to an example embodiment.

FIG. 5 is a flowchart of a method according to an example embodiment. The method may be performed by one or more computing devices, such as the user device 110. Referring to FIG. 5, a computing device receives 500 a tool for identifying content, for example, from a search engine server 120. The computing device transmits 510 an identification of the content to the search engine server 120 using the tool. The search engine server 120 then processes the content using a same search engine processing logic 200, but does not place the content in a production environment for processing future search queries. The search engine server 120 generates a predicted search result from the processing. The computing device receives 520 the predicted search result generated by the search engine processing logic 200, and displays 530 the predicted search result.

Figure 6:
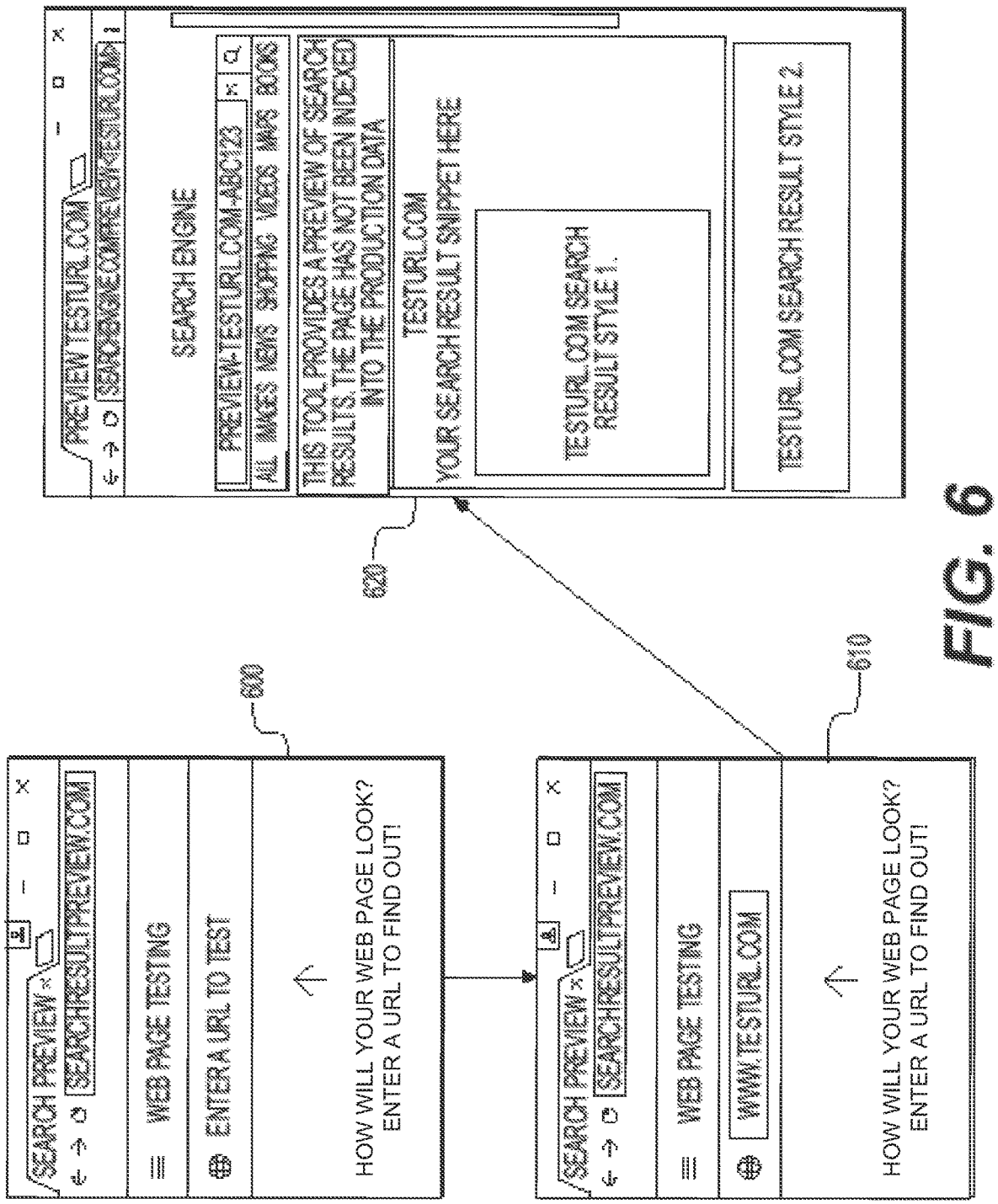
FIG. 6 illustrates a search result preview tool according to an example embodiment.

FIG. 6 illustrates a search result preview tool according to an example embodiment. As seen in FIG. 6, the search result preview tool may be accessed via a web page, and the predicted search results may be presented using a web page. As seen in 600, the search result preview tool provides an input area to input an identification of content. For example, the search result preview tool may provide an entry field to enter a URL corresponding to the content. As seen in 620, a user device 110 may receive commands corresponding to the content identification and transmit the identification of the content to a search engine server 120 using the search result preview tool. The search engine server 120 may process the content using search engine logic without adding the content to production data. Then, as seen in 620, the user device 110 receives predicted search results from the search engine sever 120 through the search result preview tool, and the user device 110 may display the predicted search result.

In some embodiments, the search engine server 120 may generate a plurality of predicted search results corresponding to a plurality of different return types or styles. For example, the search engine server 120 may return a first predicted search result in a first style corresponding to a search result in a mobile environment and a second predicted search result in a second style corresponding to a search result in a non-mobile environment. In some cases, the predicted search results may be included in a mock search results page approximating a search results page of the search engine. The user device 110 may display the mock search results page and may simultaneously display the predicted search result in a plurality of styles. For example, user device 110 may simultaneously display the first predicted search result corresponding to a search result in a mobile environment and the second predicted search result corresponding to a search result in a non-mobile environment. Both the first and second predicted search result may be displayed in a mobile or non-mobile environment, for example, on the mock search results page.

Figure 7:
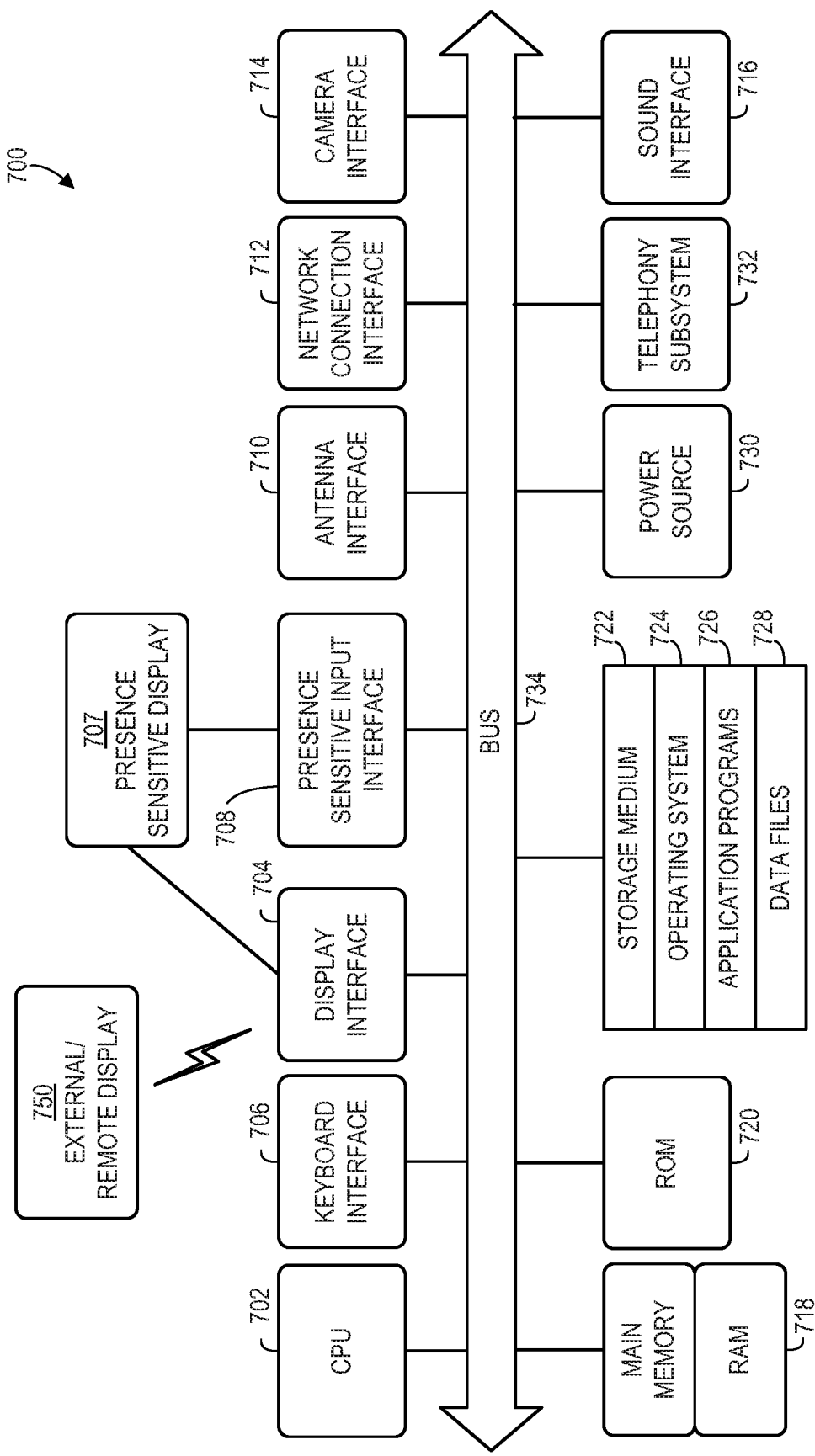
FIG. 7 is a block diagram of an illustrative computer system architecture according to an example implementation.

FIG. 7 is a block diagram of an illustrative computer system architecture 700, according to an example implementation. For example, the user device 110 and the search engine server 120 may be implemented using one or more elements from the computer system architecture 700. It will be understood that the computing device architecture 700 is provided for example purposes only and does not limit the scope of the various implementations of the present disclosed systems, methods, and computer-readable mediums.

The computing device architecture 700 of FIG. 7 includes a central processing unit (CPU) 702, where computer instructions are processed, and a display interface 704 that acts as a communication interface and provides functions for rendering video, graphics, images, and texts on the display. In certain example implementations of the disclosed technology, the display interface 704 may be directly connected to a local display, such as a touch-screen display associated with a mobile computing device. In another example implementation, the display interface 704 may be configured for providing data, images, and other information for an external/remote display 750 that is not necessarily physically connected to the mobile computing device. For example, a desktop monitor may be used for mirroring graphics and other information that is presented on a mobile computing device. In certain example implementations, the display interface 704 may wirelessly communicate, for example, via a Wi-Fi channel or other available network connection interface 712 to the external/remote display 750.

In an example implementation, the network connection interface 712 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 704 may be operatively coupled to a local display, such as a touch-screen display associated with a mobile device. In another example, the display interface 704 may be configured to provide video, graphics, images, text, other information, or any combination thereof for an external/remote display 750 that is not necessarily connected to the mobile computing device. In one example, a desktop monitor may be used for mirroring or extending graphical information that may be presented on a mobile device. In another example, the display interface 704 may wirelessly communicate, for example, via the network connection interface 712 such as a Wi-Fi transceiver to the external/remote display 750.

The computing device architecture 700 may include a keyboard interface 706 that provides a communication interface to a keyboard. In one example implementation, the computing device architecture 700 may include a presence-sensitive display interface 708 for connecting to a presence-sensitive display 707. According to certain example implementations of the disclosed technology, the presence-sensitive display interface 708 may provide a communication interface to various devices such as a pointing device, a touch screen, a depth camera, etc. which may or may not be associated with a display.

The computing device architecture 700 may be configured to use an input device via one or more of input/output interfaces (for example, the keyboard interface 706, the display interface 704, the presence sensitive display interface 708, network connection interface 712, camera interface 714, sound interface 716, etc.) to allow a user to capture information into the computing device architecture 700. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 700 or may be a separate device. For example, the input device may be an accelerometer, a magnetometer, a digital camera, a microphone, and an optical sensor.

Example implementations of the computing device architecture 700 may include an antenna interface 710 that provides a communication interface to an antenna; a network connection interface 712 that provides a communication interface to a network. As mentioned above, the display interface 704 may be in communication with the network connection interface 712, for example, to provide information for display on a remote display that is not directly connected or attached to the system. In certain implementations, a camera interface 714 is provided that acts as a communication interface and provides functions for capturing digital images from a camera. In certain implementations, a sound interface 716 is provided as a communication interface for converting sound into electrical signals using a microphone and for converting electrical signals into sound using a speaker. According to example implementations, a random access memory (RAM) 718 is provided, where computer instructions and data may be stored in a volatile memory device for processing by the CPU 702.

According to an example implementation, the computing device architecture 700 includes a read-only memory (ROM) 720 where invariant low-level system code or data for basic system functions such as basic input and output (I/O), startup, or reception of keystrokes from a keyboard are stored in a non-volatile memory device. According to an example implementation, the computing device architecture 700 includes a storage medium 722 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 724, application programs 726 (including, for example, a web browser application, a widget or gadget engine, and or other applications, as necessary) and data files 728 are stored. According to an example implementation, the computing device architecture 700 includes a power source 730 that provides an appropriate alternating current (AC) or direct current (DC) to power components.

According to an example implementation, the computing device architecture 700 includes a telephony subsystem 732 that allows the device 700 to transmit and receive sound over a telephone network. The constituent devices and the CPU 702 communicate with each other over a bus 734.

According to an example implementation, the CPU 702 has appropriate structure to be a computer processor. In one arrangement, the CPU 702 may include more than one processing unit. The RAM 718 interfaces with the computer bus 734 to provide quick RAM storage to the CPU 702 during the execution of software programs such as the operating system application programs, and device drivers. More specifically, the CPU 702 loads computer-executable process steps from the storage medium 722 or other media into a field of the RAM 718 in order to execute software programs. Data may be stored in the RAM 718, where the data may be accessed by the computer CPU 702 during execution.

The storage medium 722 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 722, which may include a machine-readable storage medium.

According to one example implementation, the term computing device, as used herein, may be a CPU, or conceptualized as a CPU (for example, the CPU 702 of FIG. 7). In this example implementation, the computing device (CPU) may be coupled, connected, and/or in communication with one or more peripheral devices, such as a display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

According to some implementations, the computer program code may control the computing device to output a tool for identifying content, receive the content identification, receive the content, access search engine processing logic, render predicted search results without placing the content into search engine production data, and transmit the predicted search results.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims and their equivalents. Although specific terms are employed herein, they are used in a generic and descriptive sense only and not for purposes of limitation.

In the foregoing description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementation," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms should be construed to take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a-given sequence, either temporally, spatially, in ranking, or in any other manner.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims and their equivalents, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving, by one or more computing devices from a user device, a locator of content, the content associated with the locator not having been previously indexed by a search engine in a search index;
   retrieving, by the one or more computing devices, the content at the locator;
   accessing, by the one or more computing devices, content processing logic of the search engine;
   processing, by the one or more computing devices, the retrieved content for preview using the content processing logic, such that the retrieved content is not made available in the search index capable of being produced as search results in response to search queries;
   generating, by the one or more computing devices, a preview of a predicted search result based on the processing of the retrieved content; and transmitting, by the one or more computing devices to the user device, the preview of the predicted search result.

2. The method of claim 1 further comprising:
outputting, by the one or more computing devices on the user device, a tool for identifying content, receiving, by the one or more computing devices, the locator to content as an input to the tool.

3. The method of claim 1 further comprising:
receiving, by the one or more computing devices from the user device, a request to index the content based on the predicted search result; and
indexing, by the one or more computing devices in response to the request, the content using the indexing logic of the search engine to make the content available as search results in response to search queries.

4. The method of claim 1, wherein the processing comprises:
creating, by the one or more computing devices, an isolated environment that is separate from a production environment of the search engine where contents are made available as search results in response to search queries; and
processing, by the one or more computing devices, the retrieved content in the isolated environment.

5. The method of claim 1, wherein the transmitting the preview of the predicted search result comprises transmitting the preview of the predicted search result embedded in a mock search query response web page mimicking a query result of the search engine.

6. The method of claim 1, wherein the generating comprises generating a plurality of predicted search results corresponding to respective query environments.

7. The method of claim 6, wherein a first predicted search result of the plurality of predicted search results corresponds to a mobile query environment, and a second predicted search result of the plurality of predicted search results corresponds to a non-mobile query environment.

8. The method of claim 1, wherein the predicted search result comprises a snippet of the retrieved content.

9. The method of claim 1, wherein the content is retrieved directly from a URL or from a file without using the searching logic of the search engine.

10. A system comprising:
one or more processors; and
a memory having stored thereon instructions that, when executed by the one or more processors, control the one or more processors to:
receive, from a user device, a locator to content, the content associated with the locator not having been previously indexed by a search engine in a search index;
retrieve the content at the locator;
access content processing logic of the search engine;
process the retrieved content for preview using the content processing logic, such that the retrieved content is not made available in the search index capable of being produced as search results in response to search queries;
generate a preview of a predicted search result based on the processing of the retrieved content; and
transmit, to the user device, the preview of the predicted search result.

11. The system of claim 10, wherein the instructions, when executed by the one or more processors, further control the one or more processors to:
receive, from the user device, a request to index the content based on the predicted search result; and
in response to the request, index the content using the indexing logic of the search engine to make the content available as search results in response to search queries.

12. The system of claim 10, wherein the instructions, when executed by the one or more processors, control the one or more processors to process the retrieved content by:
creating an isolated environment separate from a production environment of the search engine where contents are made available as search results in response to search queries; and
processing the retrieved content in the isolated environment.

13. The system of claim 10, wherein the instructions, when executed by the one or more processors, further controls the one or more processors to:
embed the predicted search result in a mock search query response web page mimicking a query result of the search engine; and
transmit the mock search query response web page to the user device.

14. The system of claim 10, wherein the instructions, when executed by the one or more processors, further controls the one or more processors to generate a plurality of predicted search results corresponding to respective query environments.

15. The system of claim 14, wherein a first predicted search result of the plurality of predicted search results corresponds to a mobile query environment, and a second predicted search result of the plurality of predicted search results corresponds to a non-mobile query environment.

16. The system of claim 10, wherein the predicted search result comprises a snippet of the retrieved content.

17. A method comprising:
accessing, by a computing device, a preview tool for previewing search results of a search engine;
submitting, by the computing device, a locator to content to be processed using the preview tool to generate a preview of a predicted search result for the content, wherein the content associated with the locator has not been indexed by a search engine in a search index;
transmitting, by the computing device, the content at the locator to the search engine server;
receiving, by the computing device, a preview of a predicted search result of the content, the content being processed for preview by only content processing logic of a search engine such that the content is not made available in the search index capable of being produced as search results in response to search queries; and
displaying, by the computing device, the preview of the predicted search result.

18. The method of claim 17 further comprising:
submitting, by the computing device using the preview tool, a request to index the content based on the displayed preview of the predicted search result, so that the content is placed in production data of the search engine and made available as search results in response to search queries.

19. The method of claim 17, wherein the receiving comprises receiving a mock search query response web page mimicking a query result of the search engine, the predicted search result being embedded in the mock search query response web page.

20. The method of claim 17, wherein
the receiving comprises receiving a plurality of predicted search results corresponding to respective query environments, a first predicted search result of the plurality of predicted search results corresponds to a mobile query environment, a second predicted search result of the plurality of predicted search results corresponds to a non-mobile query environment, and the displaying comprises displaying the first predicted search result and the second predicted search result simultaneously.

21. The method of claim 17, wherein the predicted search result comprises a snippet of the content located at the submitted locator to the content.

\* \* \* \* \*